(12) United States Patent
Terada

(10) Patent No.: US 9,933,992 B2
(45) Date of Patent: Apr. 3, 2018

(54) AUDIO SIGNAL PROCESSING APPARATUS CAPABLE OF SIGNAL PROCESSING FOR PREVIEWING PURPOSE

(71) Applicant: YAMAHA CORPORATION, Hamamatsu-shi, Shizuoka-Ken (JP)

(72) Inventor: Kotaro Terada, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/078,085

(22) Filed: Mar. 23, 2016

(65) Prior Publication Data
US 2016/0283186 A1    Sep. 29, 2016

(30) Foreign Application Priority Data

Mar. 24, 2015  (JP) .................................. 2015-061638

(51) Int. Cl.
*H04B 1/00* (2006.01)
*G06F 3/16* (2006.01)

(52) U.S. Cl.
CPC .............. *G06F 3/165* (2013.01); *G06F 3/162* (2013.01)

(58) Field of Classification Search
CPC ...... H04R 3/00; H04R 2430/01; H04R 27/00; H04R 5/04; H04R 29/008; H04R 3/04; H04R 1/1041; H04R 2420/01; H04R 29/00; H04M 1/72558; H04S 2400/01; H04S 2400/03; H04S 3/008; H04S 5/00;
(Continued)

(56) References Cited

U.S. PATENT DOCUMENTS 5,485,525 A *  1/1996  Zampini ................ G11B 20/00
                                                            381/107
5,528,255 A    6/1996  Hagimori
(Continued)

FOREIGN PATENT DOCUMENTS

JP          05157578 A      6/1993
JP       2002319914 A     10/2002

OTHER PUBLICATIONS

"Yamaha Digital Mixing Console PM5D, Digital Mixing System DSP5D, PM5D/PM5D-RH V2 DSP5D, Owner's Manual" published in 2004 by Yamaha Corporation. 409 pages.

*Primary Examiner* — Paul S Kim
*Assistant Examiner* — Norman Yu
(74) *Attorney, Agent, or Firm* — Rossi, Kimms & McDowell LLP

(57) ABSTRACT

A mixer includes a plurality of channel modules, and audio signals having processed in the individual channel modules are output from a main output. A temporary channel module is created and made usable in response to a preview start instruction for previewing a desired one of the channel modules as a preview-object channel module. The same audio signal as input to the preview-object channel module is input to the temporary channel module. The temporary channel module performs signal processing on the input audio signal independently of the preview-object channel module, and the audio signal having been subjected to the signal processing is output to a monitor output. Thus, a user is allowed to change a signal processing parameter value to be applied to an audio signal and preview the changed result, without influencing the main output.

9 Claims, 4 Drawing Sheets

(58) Field of Classification Search
CPC . H04S 5/005; H04S 1/00; H04S 1/007; H04S 7/00; H04S 2400/15; H04S 3/002
USPC ......... 715/716, 727; 704/278, 500; 381/119, 381/106, 17, 303; 386/285, 241; 700/94
See application file for complete search history.

(56) References Cited

U.S. PATENT DOCUMENTS

2002/0156547 A1* 10/2002 Suyama ................ H04H 60/04
  700/94
2004/0179695 A1* 9/2004 Terada .................. H04H 60/04
  381/56

\* cited by examiner

AUDIO SIGNAL PROCESSING APPARATUS CAPABLE OF SIGNAL PROCESSING FOR PREVIEWING PURPOSE

BACKGROUND

The present invention relates generally to an improvement in techniques for monitoring an audio signal of a given channel module in an audio signal processing apparatus which includes a plurality of channel modules for performing signal processing on audio signals input thereto and a main output section for outputting the audio signals having been subjected to the signal processing in the channel modules. More particularly, the present invention relates a technique for permitting signal processing for a previewing purpose (i.e., previewing signal processing) separately from main signal processing.

As well known in the art, the audio mixers (hereinafter referred to simply as "mixers") include a plurality of channel modules each for performing signal processing on an audio signal of one channel, and the audio mixers selectively mixes one or more audio signals and outputs a resultant mixed signal through a main output (terminal). The mixers also include a monitor output separate from the main output such that audio signals of one or more channels can be output from the monitor output. With such a monitor function, a user can listen to, i.e. monitor, audio signals of any desired one or more channels through the monitor output separate from the main output (see, for example, "YAMAHA DIGITAL MIXING CONSOLE PM5D/ PM5DRH" published in 2004 by Yamaha Corporation which is available from the Internet at http://www2.yamaha.co.jp/manual/pdf/pa/japan/mixers/PM5DJ1.pdf).

With the conventionally-known monitor function, however, while an audio signal of a given channel module is being output to the main output, the user cannot change a parameter value of the channel module and monitor the changed result, without influencing the audio signal of the main output. For example, during an actual performance in a concert or theater play, the user may want to change a parameter value and confirm a changed result of the parameter value with a view to checking settings of parameters to be used in another performance. However, even in such a case, the conventionally-known monitor function does not allow the user to change a parameter value for a checking purpose as for a channel module that is being used for the main output.

In connection with the aforementioned problem, Japanese Patent Application Laid-open Publication No. 2002-319914 discloses a preview function which displays, on a display device or the like, results obtained by changing values of parameters currently set in one or more channel modules, i.e. changed parameter settings. With this preview function disclosed in the No. 2002-319914 publication, a user can confirm, through the display, changed results of parameter values of channels currently used in the main output, without influencing the main output. With this technique, however, the user can confirm the changed results only visually and cannot listen to audio signals having been processed on the basis of the changed results of the parameter values.

Further, there has been known a connection mode called a mirror mode, where two mixers (i.e., two engines each provided with a DSP unit) are provided and audio signals are coupled to the individual mixers in parallel. In this connection mode (mirror mode), while a processed result in one of the two mixers is output from a main output, the other of the two mixers can perform signal processing independently of the one mixer and output a result of the signal processing from a monitor output (see, for example, Japanese Patent Application Laid-open Publication No. HEI-05-157578). In this case, however, two mixers, i.e. signal processing resources for the two mixers, have to be provided, and thus, particularly in the case of a large-scale mixer having a large number of channels, an enormous quantity of resources would be required.

SUMMARY OF THE INVENTION

In view of the foregoing prior art problems, it is an object of the present invention to provide an improved audio signal processing apparatus and method which, without influencing a main output, allow a user to change a parameter value to be used in signal processing on an audio signal and listen to the audio signal having been processed on the basis of the changed result of the parameter value.

In order to accomplish the above-mentioned object, the present invention provides an improved audio signal processing apparatus, which comprises: a plurality of main channel modules each configured to perform signal processing on an audio signal input thereto; a main output section configured to output the audio signals having been subjected to the signal processing in the plurality of main channel modules; a temporary channel module configured to be made usable in response to a preview start instruction for previewing a desired one of the main channel modules as a preview-object channel module, the temporary channel module inputting thereto a same audio signal as input to the preview-object channel module and performing signal processing on the input audio signal independently of the preview-object channel module; and a monitor output section configured to output the audio signal having been subjected to the signal processing in the temporary channel module.

A temporary channel module is made usable in response to a preview start instruction. The temporary channel module thus made available performs signal processing on the same audio signal as input to the preview-object channel module independently of the preview-object channel module, and the temporary channel module outputs the thus-processed audio signal (i.e., audio signal having been subjected to the signal processing) to the monitor output section separate from the main output section. Thus, even while the audio signal of the preview-object channel module is being output from the main output section, a parameter value of the signal processing on the audio signal can be changed and the audio signal processed on the basis of the changed result can be output from the monitor output section, without influencing the audio signal output from the main output section. In this manner, the signal processing for a previewing purpose (previewing signal processing) can be performed separately from the main signal processing. Because the temporary channel module is made usable (e.g., created) only temporarily when a preview start instruction has been given, the number of necessary signal processing resources need not be substantively increased.

In an embodiment of the audio signal processing apparatus of the invention, the temporary channel module may be deleted in response to a preview end instruction. Further, in an embodiment of the audio signal processing apparatus of the invention, an additional temporary channel module is made usable in response to each additional (new) preview start instruction for previewing, as another preview-object channel module, another desired one of the main channel modules than the main channel module already being previewed. According to above-described construction of the invention, only a necessary number of temporary channel modules are made usable (e.g., created) only temporarily, and thus, the present invention can significantly reduce the number of signal processing resources necessary for implementing the preview function and can efficiently use the reduced number of signal processing resources as compared to the conventional construction where signal processing resources are provided fixedly for the preview function.

Further, an embodiment of the audio signal processing apparatus of the invention further comprises a first setting section configured to set current values of parameters of the preview-object channel module as values of corresponding parameters of the temporary channel module. Because the current values of the parameters of the preview-object channel module are set as initial values of the corresponding parameters of the temporary channel module, a user can easily see how the parameter values of the temporary channels module have been changed from the parameter values of the preview-object channel module.

Further, in an embodiment of the audio signal processing apparatus of the invention, the temporary channel module is automatically connected to the monitor output section once the temporary channel module is made usable. Thus, it is possible to eliminate a trouble of manually connecting the temporary channel module to the monitor output section. Further, in an embodiment, the monitor output section may also be configured to monitor the audio signal having been subjected to the signal processing in any of the plurality of main channel modules. In this case, no bus, output terminal, etc. dedicated to the previewing is required. Further, with a construction where the monitor output section is shared between the main channel modules and the temporary channel module, audio signals of any of the main channel modules and the temporary channel module can be output simultaneously from the monitor output section.

Moreover, an embodiment of the audio signal processing apparatus of the invention further comprises an operation section (temporary-channel operation section) for changing a parameter value to be used in the signal processing in the temporary channel module. The temporary-channel operation section is constructed in the same or similar manner to an operation section (preview-object-channel operation section) for changing a parameter value of the preview-object main channel, and the temporary-channel operation section has an explicit indication that the temporary-channel operation section is an operation section for a previewing purpose. Thus, the user can perform a previewing parameter value changing operation with a similar operation feeling to an ordinary or regular parameter value changing operation.

Moreover, an embodiment of the audio signal processing apparatus of the invention further comprises a second setting section configured to set current values of parameters of the temporary channel module as current values of corresponding parameters of the preview-object channel module. Thus, changed results of the parameter values of the temporary channel module can be reflected in the signal processing of the main channel module.

The audio signal processing apparatus of the present invention can achieve the superior advantageous benefit that, even while an audio signal of the preview-object channel module is being output from the main output section, the user can preview a changed result of a signal processing parameter value to be applied to the audio signal, i.e. can change the parameter value in the temporary channel module and, through the monitor output section, listen to the audio signal having being processed on the basis of the changed parameter value, without influencing the main output.

The present invention may be constructed and implemented not only as the apparatus invention discussed above but also as a method invention. Also, the present invention may be arranged and implemented as a software program for execution by a processor, such as a computer or DSP, as well as a non-transitory computer-readable storage medium storing such a software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION

Figure 1:
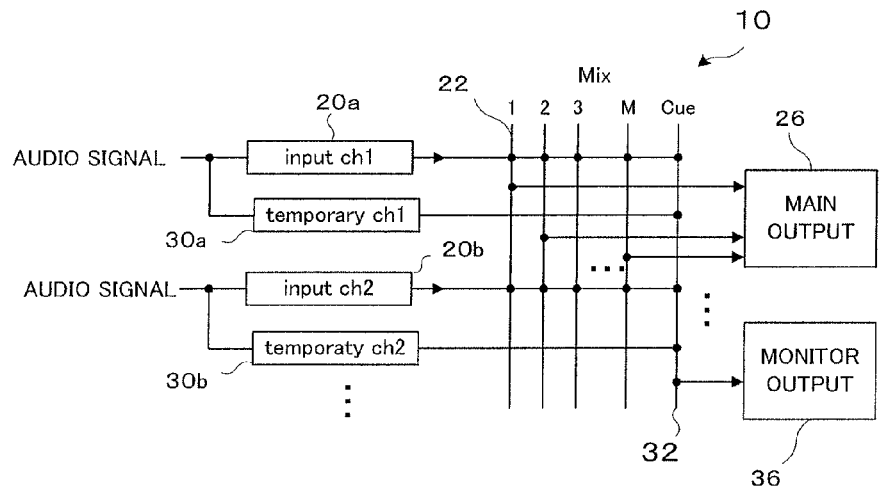
FIG. 1 is a block diagram showing an example signal processing construction of a mixing console to which is applied an embodiment of an audio signal processing apparatus of the present invention and more particularly extractively showing features of the present invention.

FIG. 1 is a block diagram showing an example signal processing construction of a mixing console (hereinafter referred to simply as "mixer") 10 to which is applied an embodiment of an audio signal processing apparatus of the present invention and more particularly extractively showing features of the present invention. The mixer 10, which includes a predetermined number of channel modules 20a, 20b, . . . ("input ch1", "input ch2", . . . in the figure), is constructed to selectively output audio signals, processed in the individual channel modules 20*a*, 20*b*, . . . , to MIX buses ("1", "2", "3", . . . "M" in the FIG. 22 and then output the audio signals from a main output 26 via the MIX buses 22. The mixer 10 also has the well-known monitor function by which it outputs an audio signal of any of the channel modules 20*a*, 20*b*, . . . to a monitor output 36, separate from the main output 26, via a CUE bus 32. Note that, in this specification, the term "channel module" is used to refer to a constituent element for performing signal processing on an audio signal of one channel. Further, in the specification, in cases where a plurality of constituent elements, such as input channel modules, are to be distinguished from one another, reference characters with suffix alphabetical letters, such as "20*a*" and "20*b*", are used for such constituent elements, but in cases where a plurality of constituent elements need not be distinguished from one another, reference characters with numerals alone, such as "20", are used for such constituent elements. Further, in the specification, channel modules essentially provided in the mixer 10, such as the above-mentioned channel modules 20*a*, 20*b*, . . . , will hereinafter be referred to also as "main channel modules" (or "input channel modules").

The instant embodiment of the mixer 10 includes a temporary channel module 30 that is made usable (or created) temporarily in response to a preview start instruction for previewing a given or desired one of the main channel modules 20 as a preview object (i.e., preview-object channel module). The same audio signal as input to the preview-object channel module 20 is input to the created temporary channel module 30, so that, signal processing is performed on the input audio signal in the created temporary channel module 30 independently of the preview-object channel module 20 and then the audio signal having been processed (subjected to the signal processing) in the temporary channel module 30 is output to the monitor output 36. Although the temporary channel module 30 includes the same signal processing elements (see FIG. 4 to be described later) as the corresponding preview-object channel module 20, values of parameters to be used in the signal processing in the temporary channel module 30 are variably set in the temporary channel module 30 independently of the preview-object channel module 20. An output path from the preview-object channel module 20 to the main output 26 and an output path from the temporary channel module 30 to the monitor output 36 are independent of each other as shown in FIG. 1, and thus, a result of the signal processing in the temporary channel module 30 does not influence the main output 26. The MIX buses 22 and the main output 26 shown in FIG. 1 together constitute a main output section that outputs audio signals having been subjected to the signal processing in the main channel modules. Further, the CUE bus 32 and the monitor output 36 shown in FIG. 1 together constitute a monitor output section separate from the main output section.

Further, in this specification, the term "preview" is used to refer to any of various operations: such as an operation where an audio signal having been subjected to the signal processing in the temporary channel module 30 is output from the monitor output 36; an operation where values of various parameters of the temporary channel module 30 are displayed on a screen and/or the like; an operation where a user listens to an audio signal output from the monitor output 36; and an operation where the user views values of parameters displayed on the screen and/or the like. Also note that, in the specification, the term "preview" and the term "monitor" are used interchangeably.

For example, a temporary channel module 30*a* ("temporary ch1" in FIG. 1) is created (or made usable) (or created) temporarily in response to a preview start instruction for previewing an input channel module 20*a* ("input ch1" in FIG. 1) as a preview object (preview-object channel module). The same audio signal as input to "input ch1" is input to the created temporary channel module 30*a*. Further, during preview of "input ch1", another temporary channel module 30*b* ("temporary ch2" in FIG. 1) is created (or made usable) temporarily in response to a preview start instruction for previewing another input channel module 20*b* ("input ch2" in FIG. 1), different from the currently previewed "input ch1", as another preview object (another preview-object channel module). The same audio signal as input to "input ch2" is input to the created temporary channel module 30*b*. In this manner, audio signals of a plurality of channels can be previewed simultaneously by use of a plurality of temporary channel modules 30.

Figure 2:
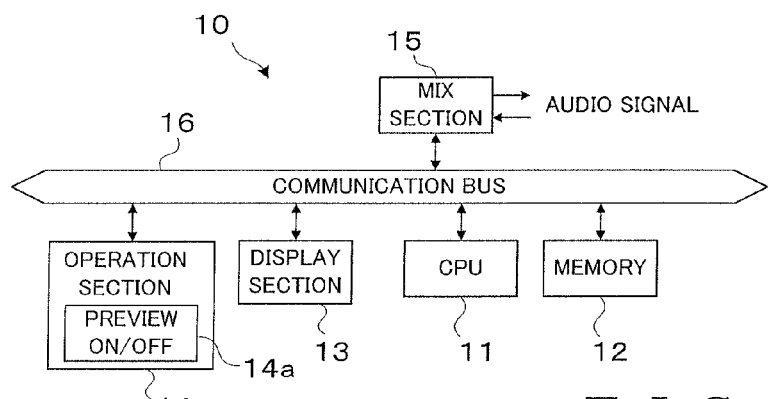
FIG. 2 is a block diagram showing an example electric hardware setup of the mixing console shown in FIG. 1.

FIG. 2 is a block diagram showing an example electric hardware setup of the embodiment of the mixer 10 shown in FIG. 1. The mixer 10 shown in FIG. 2 includes a central processing unit (CPU) 11, a memory 12, a display section 13, an operation section 14, and a signal processing section (MIX section) 15. These components 11 to 15 are interconnected via a communication bus 16, so that various control signals can be communicated between the CPU 11 and the various components 12 to 15. Further, the MIX section 15 can input or output analog or digital audio signals from or to input equipment, such as a microphone and a reproduction device, or output equipment, such as an amplifier and a speaker.

The CPU 11 controls overall operation or behavior of the mixer 10 by executing various programs stored in the memory 12. The memory 12 not only non-volatilely stores various programs to be executed by the CPU 11 and various data to be referenced by the CPU 11, but also is used as a loading area for a program to be executed by the CPU 11 and as a working area for use by the CPU 11. The memory 12 may comprise a combination of various memory devices, such as a read-only memory (ROM), a random-access memory (RAM), a flash memory and a hard disk.

The display section 13, which comprises a display device, related interface circuitry, etc., displays various information, based on display control signals given from the CPU 11, in various images, character trains, etc. The operation section 14 includes a plurality of manual operators (operating members), related interface circuitry, etc. A user or human operator of the mixer 10 uses various manual operators of the operation section 14 to perform operations for setting and changing various parameters. The CPU 11 acquires a detection signal corresponding to an input operation performed by the user on the operation section 14 or on the display device (display section 13) and controls the operation of the mixer 10 on the basis of the acquired detection signal.

The MIX section 15 comprises, for example, a signal processing device virtually implemented, for example, by a DSP (Digital Signal Processor), the CPU 11 and software stored in the memory 12. The MIX section 15 executes a signal processing program to perform signal processing on one or more digital audio signals supplied from not-shown input equipment and outputs the thus-processed digital audio signals to not-shown output equipment. The signal processing performed by the MIX section 15 includes mixing processing for mixing a plurality of audio signals, and this signal processing is controlled on the basis of current values of a plurality of parameters stored in the memory 22.

Figure 3:
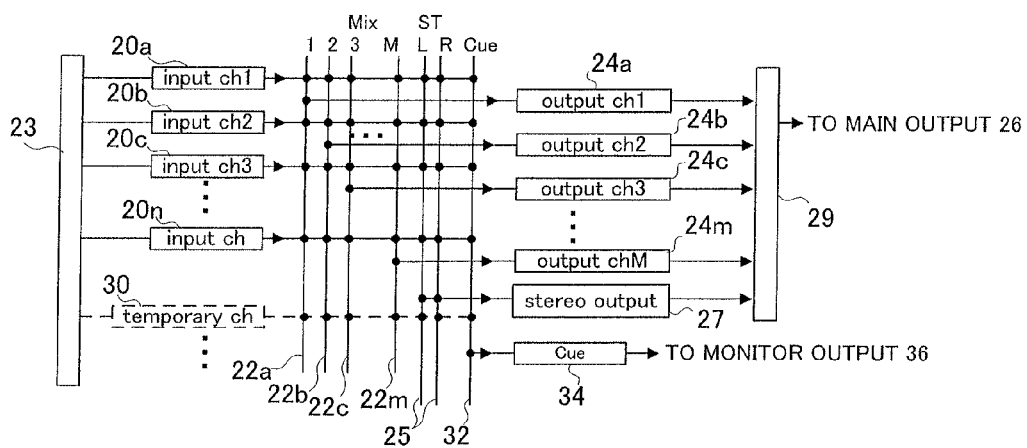
FIG. 3 is a block diagram showing an example construction for implementing a main or regular signal processing function of the mixing shown in FIG. 1.

FIG. 3 is a block diagram showing an example construction for implementing a main or regular signal processing function permanently or fixedly possessed by the mixer 10 shown in FIG. 1. In FIG. 3, elements related to the regular signal processing function are depicted by solid lines. Signal processing resources of the MIX section 15 and the memory 12 that are necessary for performing the regular signal processing function by means of the plurality of channel modules are fixedly allocated in advance. As shown in FIG. 3, the mixer 10 includes, as the elements related to the regular signal processing function: the plurality of input channel modules ("input ch1", "input ch2", "input ch3", . . . , "input chN" in the FIGS. 20a to 20n; the plurality of MIX buses 22a to 22m ("1", "2", "3", . . . "M" in the FIGS. 22a to 22m; stereo output buses ("ST L" and "ST R" in the FIG. 25; a CUE bus 32; output channel modules ("out ch1", "out ch2", "out ch3", . . . out chM) 24a to 24m; and a stereo output channel module 27. Each of the input channel modules 20a to 20n receives an audio signal from an input port (not shown) associated with that input channel module via an input patch section 23, performs signal processing on the received audio signal on the basis of values of various parameters and outputs the thus-processed audio signal selectively to any of the MIX buses 22a to 22m, stereo output buses 25 or the CUE bus 32. Each of the output channel modules 24a to 24m and 27 performs signal processing, based on values of various parameters specific to that channel, on the audio signal output from a corresponding one of the MIX buses 22a to 22m and the stereo output buses 25 and outputs the thus-processed audio signal to the main output 26 via an output patch section 29. The main output 26 is connected, for example, to a main speaker oriented toward audience seats in a venue or the like, recording equipment, and/or the like. Various signal processing to be performed in the channel modules 20, 24 and 27 includes tone volume level adjustment, equalizing, impartment of various effects, etc. based on values of various parameters stored in the memory 12.

Further, one or more audio signals input to the CUE bus 32 are output to the monitor output 36 via a CUE module 34 that performs, for example, tone volume level adjustment, etc. Headphones or the like are connected to the monitor output 36. In addition to the regular signal processing function possessed by the mixer 10 as depicted by solid lines in FIG. 3, one or more temporary channel modules 30 are created as depicted by broken lines according to the principles of the embodiment of the invention.

Figure 4:
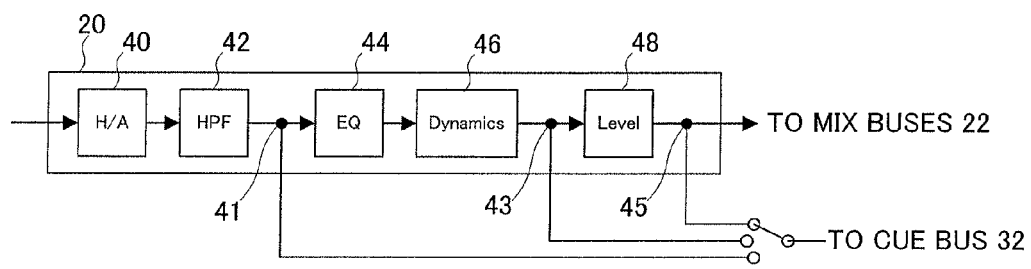
FIG. 4 is a block diagram showing an example detailed construction of the input channel module 20.

FIG. 4 is a block diagram showing an example detailed construction of the input channel module 20. The input channel module 20 includes as a plurality of signal processing elements: a head amplifier ("HA" in the FIG. 40; a high-pass filter ("HPF" in the FIG. 42; an equalizer ("EQ" in the FIG. 44; a dynamics adjuster ("Dynamics" in the FIG. 46 including a gate, a compressor, etc.; and a tone volume level adjuster ("Level" in the FIG. 48. Signal processing is performed by these signal processing elements 40, 42, 44, 46 and 48 on the basis of values of corresponding parameters stored in the memory 12.

Further, as shown in FIG. 4, the input channel module 20 includes a plurality of CUE output points 41, 43 and 45 so that it can output, to the CUE bus 32, an audio signal taken out from the CUE output point 41, 43 or 45. Selection among the CUE output points 41, 43 and 45 is controlled on the basis of a value of a CUE ON/OFF parameter of the input channel module 20 stored in the memory 12. The value of the CUE ON/OFF parameter indicates which one of the CUE output points 41, 43 and 45 should be selected or that none of the CUE output points 41, 43 and 45 should be selected (i.e., CUE OFF). Note that the CUE output point may be provided at suitable one or more positions on the input channel module 20 rather than at the three positions illustrated in FIG. 4.

Each of the output channel modules 24 and stereo output channel modules 27 is constructed generally similarly to the input channel module 20 shown in FIG. 4. Namely, like the input channel module 20 shown in FIG. 4, each of the output channel modules 24 and stereo output channel module 27 includes a plurality of signal processing elements and a plurality of CUE output points and performs signal processing on the basis of current values of various parameters stored in the memory 12.

With the conventionally-known monitor function, as noted above, while an audio signal of a given one of the channel modules 20, 24 and 27 is being output from the main output 26, it is not possible to change, for a checking purpose, a value of a parameter of signal processing on the audio signal and monitor the changed result of the parameter value.

In view of the aforementioned problem, the mixer 10 of the present invention is constructed to create a temporary channel module 30, dedicated to previewing, in response to a preview start instruction as shown in FIG. 1. Namely, the mixer 10 has potentially secured therein signal processing resources necessary for the signal processing in one or more temporary channel modules 30, and it is constructed to allocate the signal processing resources of the MIX section 15 and the memory 12 to a newly-created temporary channel module 30 each time a preview start instruction is given.

Figure 5:
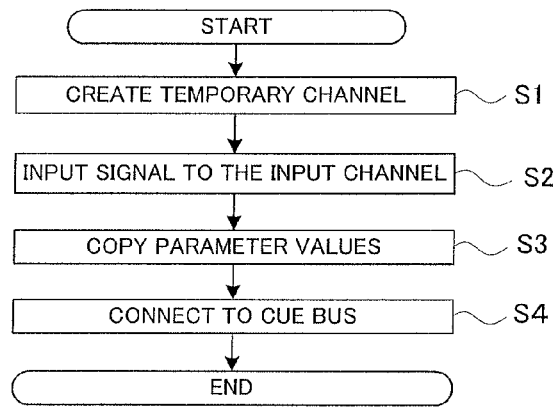
FIG. 5 is a flow chart showing an example of processing for creating a temporary channel module.

FIG. 5 is a flow chart showing an example of processing for creating a temporary channel module 30. The following describe the processing in relation to a case where one of the input channel modules 20 is designated as a preview object (preview-object channel module). The instant embodiment is constructed in such a manner that the user can instruct a start of preview with a desired input channel module 20(x) of the plurality of input channel modules 20 designated or selected as a preview-object channel module. Any desired construction may be employed for allowing the user to select the preview-object channel and to instruct the start of preview as along as the preview-object channel module can be designated and the start (and end) of the preview of the designated channel module can be instructed. For example, the operation section 14 in the mixer 10 may include physical manual operators, and a preview ON/OFF switch 14a (FIG. 2) may be provided per channel strip (i.e., a group of parameter value adjusting manual operators for one channel. As another example, the mixer 10 may be constructed to display an image of the preview ON/OFF switch per channel strip on the display device (display section 13) such that the user can perform ON/OFF operation on the image of the preview ON/OFF switch. Alternatively, the mixer 10 may be constructed to receive, from an external source, information related to a preview start instruction or a preview end instruction including a selection of a preview-object channel module.

The CPU 11 starts the processing of FIG. 5 in response to a preview start instruction for previewing a given input channel module 20 as a preview object. First, at step S1, the CPU 11 creates a temporary channel module 30 corresponding to the given input channel module 20. For example, if "input ch1" 20a has been designated, for example, the CPU 11 creates a temporary channel module 30a (FIG. 1) corresponding to the designated channel 20a. At step S1, the CPU 11 also effects allocation of signal processing resources of the MIX section 15 and the memory 12 to the temporary channel module 30 for which the current preview start instruction has been given and makes various settings for the MIX section 15 among other things.

Like the preview-object input channel module 20, the temporary channel module 30 created at step S1 above not only includes, a head amplifier 40, a high-pass filter 42, an equalizer 44, a dynamics adjuster 46 and a tone volume level adjuster 48 but also includes a plurality of CUE output points 41, 43 and 45 (see FIG. 4). However, unlike the preview-object input channel module 20, the temporary channel module 30 need not necessarily include output paths to the MIX buses 22 and to the stereo output buses 25.

Then, at step S2, the CPU 11 sets the input patch section 23 so that the same audio signal as input to the preview-object channel module 20 is input to the created temporary channel module 30. For example, if "input ch1" 20a is the preview-object channel module, the CPU 11 associates, via the input patch section 23, an input port associated with the preview-object "input ch1" 20a with the current created temporary channel module 30a. Thus, as shown in FIG. 1, the audio signal being input to the preview-object channel module 20 is input to the corresponding temporary channel module 30a in parallel with the preview-object channel module 20.

At next step S3, the CPU 11 copies values of various parameters of the preview-object channel module 20 stored in the memory 12 and stores the thus-copied values of the parameters into the memory 12 as parameter values of the created temporary channel module 30. Thus, the current values of the parameters of the preview-object channel module 20 are set as initial values of corresponding parameters of the temporary channel module 30. A combination of the CPU 11 and the operation of step S3 above constitutes a first setting section that sets the current values of the parameters of the preview-object channel module 20 as the initial values of the corresponding parameters of the temporary channel module 30.

At step S4, the CPU 11 automatically connects a selected one of the CUE output points 41, 43 and 45 of the created temporary channel module 30 to the CUE bus 32 on the basis of a value of the CUE ON/OFF parameter stored in the memory 12. Thus, an audio signal taken out from the selected CUE output point 41, 43 or 45 is output from the monitor output 36 via the CUE bus 32. Such automatic connection of the selected CUE output point 41, 43 or 45 to the CUE bus 32 can save the trouble of setting a signal path through a manual operation. Note that, when the value of the CUE ON/OFF parameter is indicative of OFF, the temporary channel module 30 is not connected to the CUE bus 32.

Figure 6:
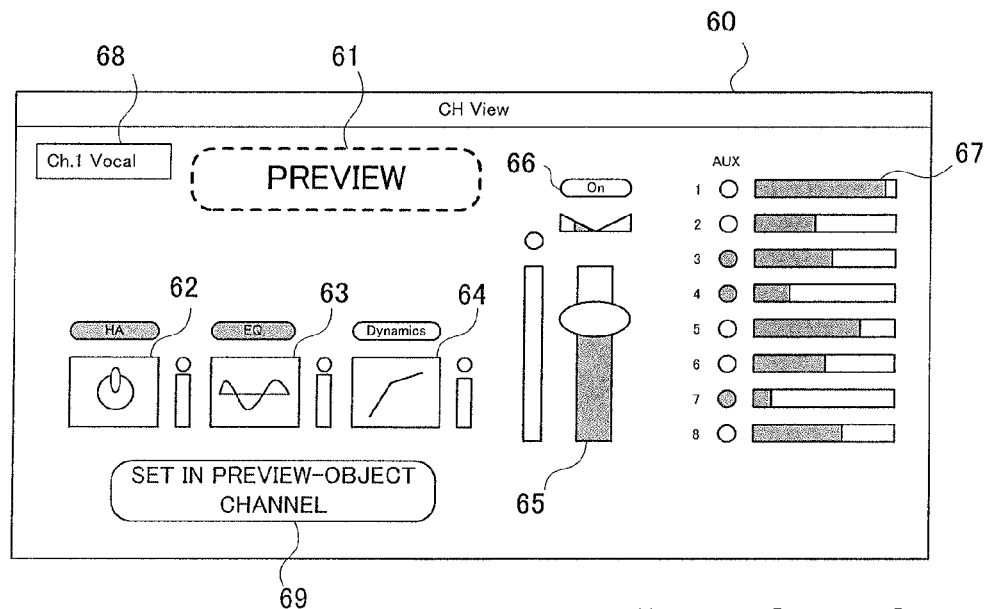
FIG. 6 is a diagram showing a previewing channel view screen as an example of a screen for changing a signal processing parameter value of the temporary channel module.

Further, the user can change the value of any desired one of the parameters of the temporary channel module 30 via a preview display screen displayed on the display device (display section 13). FIG. 6 shows a channel view ("CH View") screen 60 related to a single temporary channel module 30 as an example of the preview display screen. The CPU 11 displays the channel view screen 60, related to the user-designated temporary channel module 30, on the display device (display section 13). As shown in FIG. 6, icons of various signal processing elements, such as a head amplifier 62, equalizer 63, dynamics adjuster 64, tone volume adjusting fader operator 65 and channel ON/OFF switch 66, are displayed on the channel view screen 60. These icons 62 to 66 indicate current values of corresponding parameters in the designated temporary channel module 30. In addition to such icons, level meters 67 indicative of signal levels of a plurality of channels and channel information 68 indicative of respective channel Nos. etc. are displayed on the channel view screen 60.

The preview-displaying channel view screen 60 is constructed in the same or similar manner to a regular channel view screen provided for changing parameter values of the preview-object channel module 20. Namely, the regular channel view screen also displays the various indications 62 to 68 in the same layout as the preview-displaying channel view screen 60 of FIG. 6. For distinction from the regular channel view screen, the preview-displaying channel view screen 60 displays a preview indication (character train "Preview" in FIG. 6) 61 clearly indicating that a previewing display is currently ON. As an example, the preview indication 61 may be displayed in a different display style from the other indications 62 to 68, such as in a blinking display style. With the preview-displaying channel view screen 60 constructed in the same or similar manner to the regular channel view screen, it is possible to provide an easy-to-see and easy-to-operate interface. Further, even where the preview-displaying channel view screen 60 constructed in the same manner as the regular channel view screen, the preview indication 61 can reliably prevent the user from mixing up the two screens.

The user can operate any one of the icons 62 to 66 via the operation section 14 to thereby change a value of a parameter corresponding to the operated icon. In response to such a user's value changing operation, the CPU 11 changes the value of the corresponding parameter stored in the memory 12.

Figure 7:
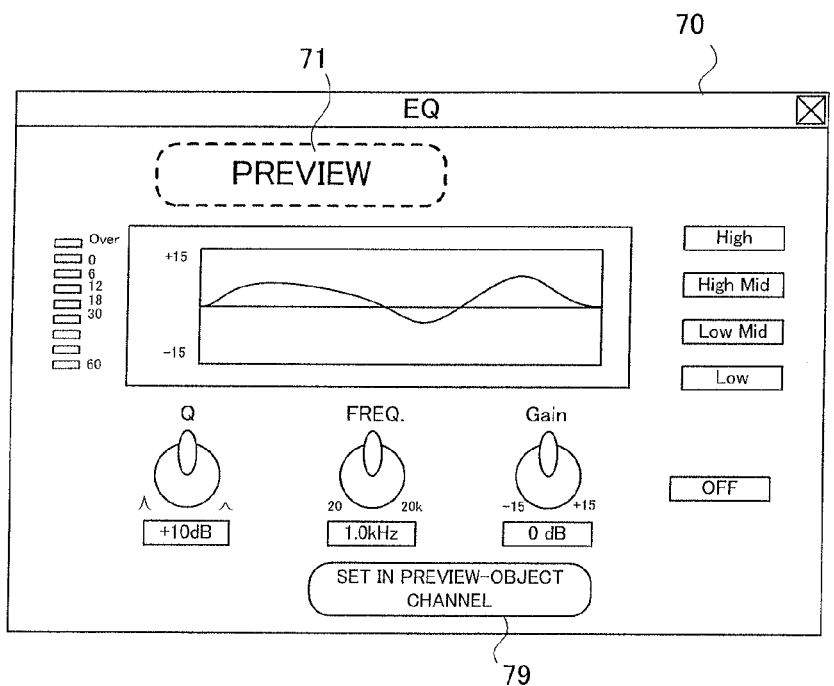
FIG. 7 is a diagram showing a previewing equalizer screen as another example of the screen for changing a signal processing parameter value of the temporary channel module.
Figure 8:
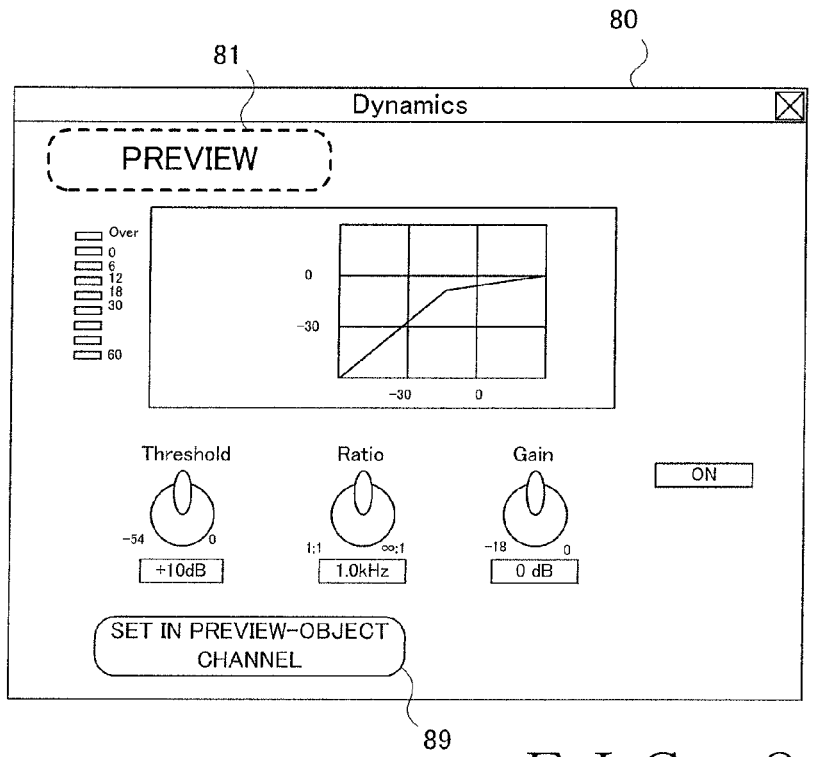
FIG. 8 is a diagram showing a previewing dynamics adjusting screen as still another example of the screen for changing a signal processing parameter value of the temporary channel module.

The preview display screen is not limited to the channel view screen 60 alone and may be a detailed adjusting screen for adjusting in detail a value of a parameter of a single signal processing element, such as an equalizing adjusting screen 70 shown in FIG. 7 or a dynamics adjusting screen 80 shown in FIG. 8. Once any one of the icons 62 to 66 is selected on the channel view screen 60 and display of a screen is instructed, the CPU 11 displays on the display device (display section 13) a detailed adjusting screen of the signal processing element corresponding to the selected icon. The detailed adjusting screens 70 and 80 too are constructed in the same or similar manner to the corresponding regular detailed adjusting screens and clearly indicate by respective indications 71 and 81 that a previewing display is currently ON. In response to a user's value changing operation on the detailed adjusting screen 70 or 80, the CPU 11 changes the value of the corresponding parameter stored in the memory 12.

Figure 9:
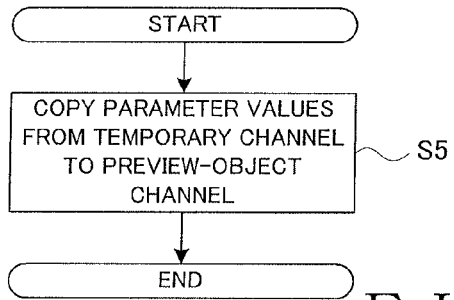
FIG. 9 is a flow chart showing an example process for setting a value of a signal processing parameter, set in the temporary channel module, into a preview-object channel module.

On the preview-displaying screens 60, 70 and 80 shown in FIGS. 6 to 8 are provided setting instructing buttons ("Set in Preview-Object Channel" buttons in the FIGS. 69, 79 and 89, respectively. In response to an operation of any one of the setting instructing buttons 69, 79 and 89, the CPU 11 stores values of individual parameters of the temporary channel module 30 stored in the memory 12 into the memory 12 as values of the corresponding parameters of the preview-object input channel module 20 (step S9 of FIG. 9). In this manner, results of parameter value changes of the temporary channel module 30 are reflected in an output signal of the main output 26. A combination of the CPU 11 and the operation of step S5 above constitutes a second setting section that sets current values of the individual parameters of the temporary channel module 30 as current values of the corresponding parameters of the preview-object channel module 20.

Figure 10:
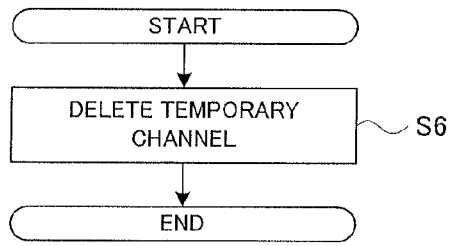
FIG. 10 is a flow chart showing an example process for deleting the temporary channel module.

The temporary channel module 30 is deleted upon ending of the preview. Ending of the preview can be instructed per temporary channel module 30 by an operation of the preview ON/OFF switch or a preview ON/OFF switch image. In response to a preview end instruction of a given temporary channel 30, the CPU 11 deletes the given temporary channel 30 (step S6 of FIG. 10). Namely, the CPU 11 not only releases the signal processing resources (e.g., a task and a memory) allocated to the given temporary channel 30, but also deletes audio signal input/output settings of the given temporary channel 30.

By creating a temporary channel 30 in response to a preview start instruction, as noted above, it is possible to perform signal processing on a preview-object audio signal by use of the created temporary channel 30 independently of the preview-object channel module 20 and then output a result of the signal processing to the monitor output 36. Note that the output signal of the temporary channel module 30 is not output to the main output 26. Meanwhile, the preview-object input channel module 20 continues to output an audio signal, having been subjected to the signal processing in the preview-object input channel module 20, even after the creation of the temporary channel module 30. Thus, even when a value of a parameter has been changed in the temporary channel module 30, the audio signal output from the main output 26 is not influenced. Therefore, even during an actual performance in a concert, theater play or the like, a parameter value of the preview-object input channel module 20 outputting an audio signal to the main output 26 can be changed to another parameter value, which is to be used in another performance and the changed result can be previewed without influencing the main output 26.

Because the above-described construction of the embodiment creates a temporary channel module 30 temporarily in response to a preview start instruction, the number of signal processing resources necessary for implementing the preview function can be reduced as compared to the construction where a channel module 30 is provided fixedly for the preview function. Besides, the thus-reduced signal processing resources can be used efficiently. Further, because the output paths (to the CUE bus 32 and monitor output 36) to be used for the preview are components provided permanently in the mixer 10 rather than dedicated to the preview function, the preview function can be implemented economically without increasing the number of necessary structural elements. Further, because the output paths (to the CUE bus 32 and monitor output 36) are used also for a monitor function of the regular channel modules 20 (see FIGS. 1 and 3), the instant embodiment allows the user to simultaneously monitor an audio signal of any one of the regular channel modules 20 and an audio signal of any one of the temporary channel modules 30.

Whereas the present invention has been described above in relation to the preferred embodiment, the present invention is not limited to the above-described preferred embodiment and may be modified variously within the scope of the technical idea disclosed in the appended claims, the specification and the drawings. For example, the preview object may be either an output channel module 24 or a stereo output channel module 27. Further, initial values of various parameters of the temporary channel module 30 may be given predetermined values other than current values of the preview-object channel module 24, 24 or 27, and there may be provided output paths (to the CUE bus and monitor output) dedicated to the preview function.

Furthermore, the application of the audio signal processing apparatus of the present invention is not limited to hardware mixers like the above-described mixer 10, and the audio signal processing apparatus of the present invention may be applied to mixers virtually implemented by a software program and any other devices and apparatus than audio mixers, such as multi-channel recording apparatus.

Further, the present invention may be constructed and implemented as a method invention for previewing a changed result of a parameter value to be used in signal processing in an audio signal processing apparatus which includes: a plurality of channel modules each configured to perform signal processing on an audio signal input thereto; and a main output section configured to output the audio signal having been subjected to the signal processing in each of the channel modules, the method comprising: a step of creating, in response to a preview start instruction designating any one of the channel modules as an preview-object channel module, a temporary channel module for performing previewing signal processing; and a step of inputting to the created temporary channel module the same audio signal as input to the preview-object channel module. Further, the present invention may be constructed and implemented as a program for causing a computer to perform a process for previewing a changed result of a parameter value to be used in signal processing in the aforementioned audio signal processing apparatus, the program causing the computer to perform: a step of creating, in response to a preview start instruction designating any one of the channel modules as an preview-object channel module, a temporary channel module for performing previewing signal processing; and a step of inputting to the created temporary channel module a same audio signal as input to the preview-object channel module.

This application is based on, and claims priority to, JP PA 2015-061638 filed on 24 Mar. 2015. The disclosure of the priority application, in its entirety, including the drawings, claims, and the specification thereof, are incorporated herein by reference.

What is claimed is:

1. An audio signal processing apparatus comprising:
   a plurality of main channels each configured to receive an audio signal and perform signal processing on the received audio signal;
   a main output interface configured to audibly output audio signals processed by the plurality of main channels;
   a cue channel configured to receive and audibly output the audio signal output from any of the plurality of main channels; and
   a processor configured to implement instructions stored in a memory and execute a plurality of processing tasks, including, in response to a preview start instruction for previewing a desired one of the plurality of main channels as a preview-object channel:
      a temporary channel generating task that generates a temporary channel that mirrors the preview-object channel;
      an inputting task that inputs a same audio signal input to the preview-object channel to the temporary channel to perform signal processing on the input audio signal independently of the preview-object channel; and
      a monitor output task that outputs the audio signal having been signal processed by the temporary channel to the cue channel, while not outputting to the main output interface.

2. The audio signal processing apparatus as claimed in claim 1, wherein the plurality of processing tasks further includes a temporary channel deleting task that deletes the temporary channel in response to a preview end instruction.

3. The audio signal processing apparatus as claimed in claim 1, wherein the temporary channel generating task further generates, in response to each additional preview start instruction for previewing another desired one of the main channels as another preview-object channel, another temporary channel that mirrors the another preview-object channel.

4. The audio signal processing apparatus as claimed in claim 1, wherein the plurality of processing tasks further includes a parameter setting task that sets current values of parameters of the preview-object channel as values of corresponding parameters of the temporary channel.

5. The audio signal processing apparatus as claimed in claim 1, wherein the monitor output task automatically connects the temporary channel to the cue channel upon the temporary channel generating task generating the temporary channel.

6. The audio signal processing apparatus as claimed in claim 1, further comprising an operation section including a display interface configured to receive a parameter value to be used in the signal processing in the temporary channel, the display interface displaying that the parameter value to be received is for a previewing purpose.

7. The audio signal processing apparatus as claimed in claim 1, wherein the plurality of processing tasks further includes a parameter setting task that sets current values of parameters of the temporary channel as current values of corresponding parameters of the preview-object channel.

8. A method of previewing a changed result of a parameter value to be used in signal processing in an audio signal processing apparatus including:
   a plurality of main channels each configured to receive an audio signal and perform signal processing on the received audio signal;
   a main output interface configured to audibly output audio signals processed by the plurality of main channels;
   a cue channel configured to receive and audibly output the audio signal output from any of the plurality of main channels,
   wherein the method comprises the steps of, in response to a preview start instruction for previewing a desired one of the main channels as a preview-object channel:
   generating a temporary channel that mirrors the preview-object channel;
   inputting, to the temporary channel, a same audio signal input to the preview-object channel to perform signal processing on the audio signal input to the temporary channel independently of the preview-object channel; and
   outputting the audio signal having been signal processed by the temporary channel to the cue channel, while not outputting to the main output interface.

9. A non-transitory computer-readable storage medium storing instructions executable by a processor for performing a method of previewing a changed result of a parameter value to be used in signal processing in an audio signal processing apparatus including:
   a plurality of main channels each configured to receive an audio signal and perform signal processing on the received audio signal;
   a main output interface configured to audibly output audio signals processed by the plurality of main channels;
   a cue channel configured to receive and audibly output the audio signal output from any of the plurality of main channels,
   wherein the method comprises the steps of, in response to a preview start instruction for previewing a desired one of the main channels as a preview-object channel:
   generating a temporary channel that mirrors the preview-object channel;
   inputting, to the temporary channel, a same audio signal input to the preview-object channel to perform signal processing on the audio signal input to the temporary channel independently of the preview-object channel; and
   outputting the audio signal having been signal processed by the temporary channel to the cue channel, while not outputting to the main output interface.

* * * * *